(12) United States Patent
Loprieno et al.

(10) Patent No.: US 10,182,039 B2
(45) Date of Patent: Jan. 15, 2019

(54) ENCRYPTED AND AUTHENTICATED DATA FRAME

(71) Applicant: Cisco Technology, Inc., San Jose, CA (US)

(72) Inventors: Gilberto Loprieno, Milan (IT); Davide Codella, Cermenate (IT)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 15/015,548

(22) Filed: Feb. 4, 2016

(65) Prior Publication Data
US 2017/0230338 A1 Aug. 10, 2017

(51) Int. Cl.
*H04L 29/06* (2006.01)
*H04L 9/06* (2006.01)

(52) U.S. Cl.
CPC .......... *H04L 63/0428* (2013.01); *H04L 9/06* (2013.01); *H04L 9/065* (2013.01); *H04L 63/04* (2013.01); *H04L 63/0442* (2013.01); *H04L 63/126* (2013.01)

(58) Field of Classification Search
CPC ....... H04L 9/06; H04L 9/0618; H04L 9/0631; H04L 9/065; H04L 9/0656; H04L 63/04; H04L 63/0428; H04L 63/0435; H04L 63/0442; H04L 63/045; H04L 63/0457
See application file for complete search history.

(56) References Cited

U.S. PATENT DOCUMENTS

| | | | |
|---|---|---|---|
| 7,349,537 B2 | 3/2008 | Kramer et al. | |
| 7,406,595 B1 * | 7/2008 | Boyle, Jr. | H04L 9/0637 708/521 |
| 8,666,074 B2 | 3/2014 | Zhu et al. | |
| 2014/0044262 A1 | 2/2014 | Loprieno et al. | |
| 2017/0171163 A1 * | 6/2017 | Gareau | H04L 63/061 |

OTHER PUBLICATIONS

Begin, Cedrik, et al., "FlexE Implementation Agreement—Initial Text Proposal", Optical Internetworking Forum, Apr. 2015.

* cited by examiner

*Primary Examiner* — Edward Zee
(74) *Attorney, Agent, or Firm* — Edell, Shapiro & Finnan, LLC

(57) ABSTRACT

At a source network device, data is compiled into a plurality of data blocks for transmission in a data frame over a network to a destination network device. The plurality of data blocks are arranged into a plurality of data block groups such that each data block group comprises a predetermined number of data blocks. Encryption information is generated for each of the plurality of data blocks groups. The encryption information identifies an encryption key for each of the plurality of data block groups. Overhead data configured to allow the destination network device to align and decode the data frame is generated. The data frame is transmitted from the source network device to the destination network device such that the encryption information for each of the plurality of data block groups is transmitted consecutively with a respective data block group, and a portion of the overhead data is transmitted prior to each consecutive transmission of encryption information with a data block group.

20 Claims, 7 Drawing Sheets

ENCRYPTED AND AUTHENTICATED DATA FRAME

TECHNICAL FIELD

The present disclosure relates to data frames for transmission through networks.

BACKGROUND

A data frame is a digital data transmission unit used in computer networking and telecommunication. A frame typically includes frame synchronization features consisting of a sequence of bits or symbols that indicate to the receiver the beginning and end of the payload data within the stream of symbols or bits it receives. A frame is a series of bits generally composed of framing bits and the packet payload. Examples are Ethernet frames, Point-to-Point Protocol (PPP) frames, Fiber Channel frames, and frames formatted according to the Flex Ethernet Implementation Agreement (FlexE) of the Optical Internetworking Forum.

DESCRIPTION OF EXAMPLE EMBODIMENTS

Overview

At a source network device, data is compiled into a plurality of data blocks for transmission in a data frame over a network to a destination network device. The plurality of data blocks are arranged into a plurality of data block groups such that each data block group comprises a predetermined number of data blocks. Encryption information is generated for each of the plurality of data blocks groups. The encryption information identifies an encryption key for each of the plurality of data block groups. Overhead data configured to allow the destination network device to align and decode the data frame is generated. The data frame is transmitted from the source network device to the destination network device such that the encryption information for each of the plurality of data block groups is transmitted consecutively with a respective data block group, and a portion of the overhead data is transmitted prior to each consecutive transmission of encryption information with a data block group.

Example Embodiments

Figure 1A:
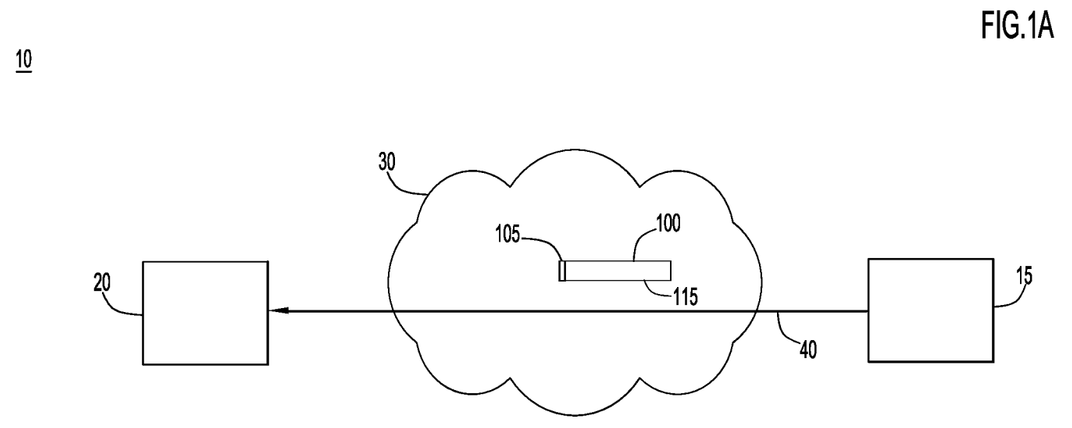
FIG. 1A is an illustration of a network environment configured for the transmission and reception of encrypted and authenticated data frames, according to an example embodiment.

With reference made to FIG. 1A, depicted therein is a network environment 10 in which a data frame 100 is transmitted from a source network device 15 to a destination network device 20 through network 30. According to the example embodiment of FIG. 1A, data frame 100 is transmitted through network 30 via optical link 40. Source (e.g., transmitting) network device 15 is configured to generate and transmit data frame 100 such that data frame 100 is encrypted. Source network device 15 also generates and transmits data frame 100 to include encryption and authentication information that will allow destination network device 20 to decrypt and authenticate the data included within data frame 100. Specifically, data frame 100 includes overhead portion 105 and data block group 115, the contents of which are configured to facilitate and authenticate the data of data frame 100.

Figure 1B:
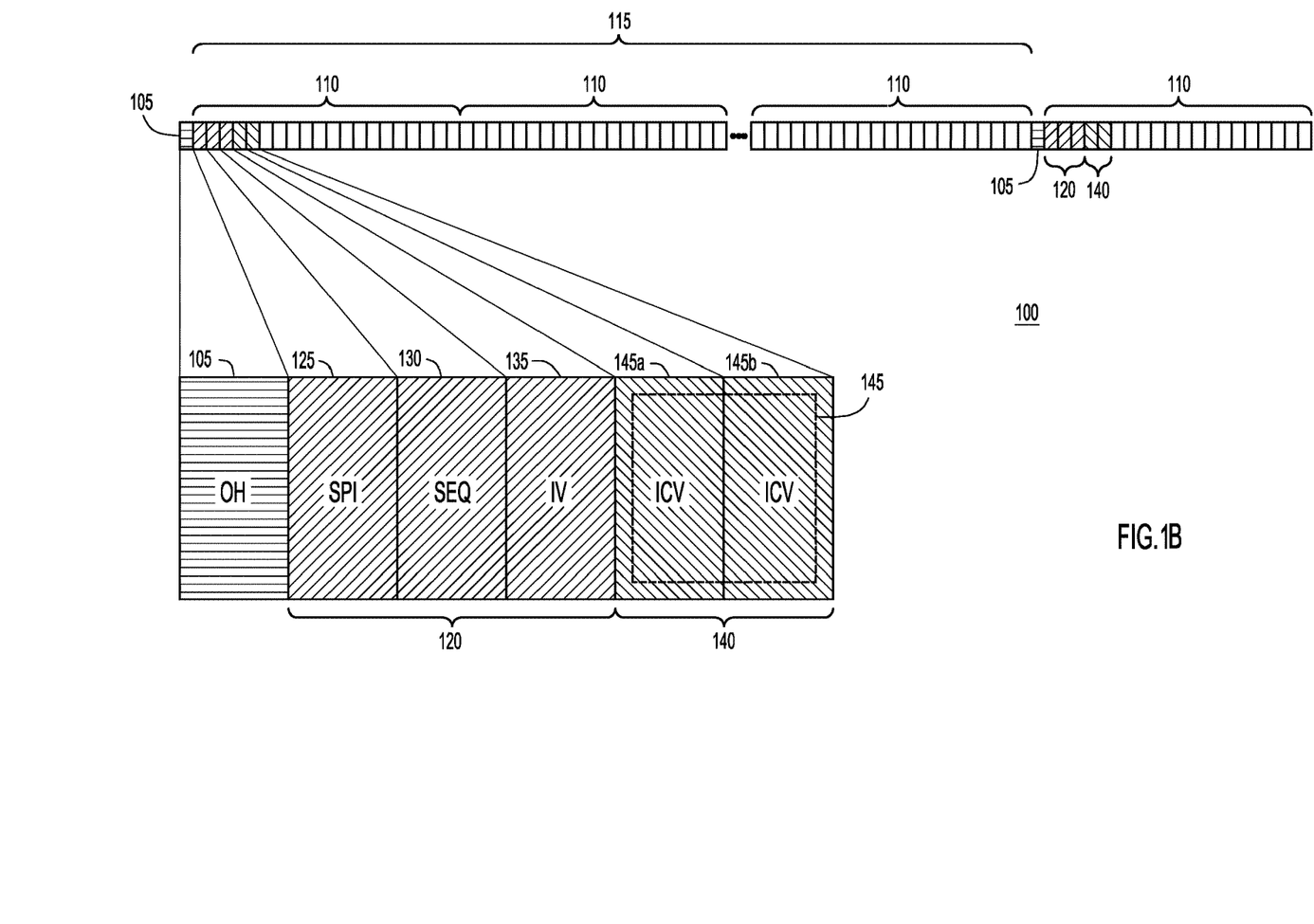
FIG. 1B is an illustration of an encrypted and authenticated data frame, according to an example embodiment.

Depicted in FIG. 1B is a detailed view of data frame 100, illustrating the structures that apply encryption to data frame 100 while also facilitating the transport of large amounts of data. For example, data frame 100 may be a data frame constructed to conform with the Flex Ethernet Implementation Agreement (FlexE) of the Optical Internetworking Forum, though the techniques described herein may be applied to other types of data frames as well.

The structure of data frame 100 includes overhead sections 105 and a repeating calendar structure 110. The overhead sections 105 include data that allows data frame 100 to be aligned and decoded at a destination network device to which the data frame will be transmitted. Each repeating calendar structure 110 of example data frame 100 may include 20 data blocks, in which each data block includes 66 bits, or 8 bytes encoded as a 64 b/66 b line code. In data frame 100, overhead section 105 may be inserted between 1023 repetitions of calendar structure 110. Other example embodiments may use a different number of calendar structures 110, such as 1024 calendar structures, 512 calendar structures, 128 structures, and others. As each calendar structure 110 includes 20 data blocks, 1023×20 data blocks, or 20460 data blocks are included between each overhead section 105. As used herein, the 1023 calendar structures, or 20460 data blocks are referred to herein as a "data block group" 115. In other words a "data block group" is a group of data blocks separated by an overhead section 105.

Data frame 100 may have a repeating structure of "rows" in which a single data frame 100 includes multiple overhead sections 105 and multiple data block groups 115. In other words, a row of the data frame includes an overhead section 105 and a data block group 115. By defining the frame as a plurality of groupings of overhead sections 105 and data block groups 115, the overhead data for a single data frame may be spread across a plurality of overhead sections 105.

Figure 2:
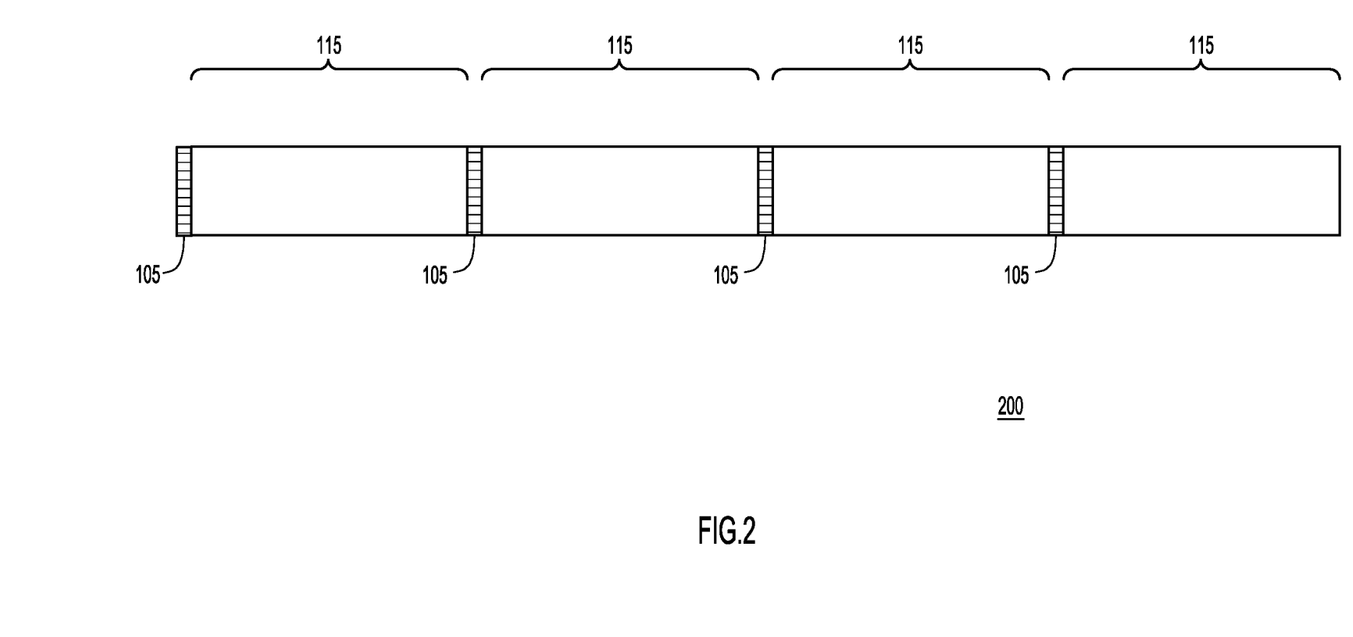
FIG. 2 is an illustration of an encrypted and authenticated data frame that includes a plurality of rows, according to an example embodiment.

Turning briefly to FIG. 2, depicted therein is an example data frame 200 comprised of four overhead sections 105 and four data block groups 115. In other words, data frame 200 includes four rows. When using a data frame structure like that of data frame 200, the overhead data may be spread across the four overhead sections 105. Accordingly, more overhead data may accompany data frame 200 than would be possible for a data frame with a single over head section 105. If each of overhead sections 105 comprises 8 bytes, the use of four overhead sections 105 allows for 32 bytes of overhead data to accompany data frame 200. In order to achieve 100 Gbps transmission rates, data frame 200 may be transmitted with a period of 52.4 μs, meaning an overhead section 105 will be received every 13.1 μs.

Other example embodiments may construct data frames using a greater number of data block groups 115 and overhead sections 105. For example, other data frames utilizing the techniques described herein may use eight data block groups 115, each with an overhead section 105. In other words, such a data frame would be constructed from eight rows. In such a data frame, the overhead data may be spread across the eight overhead sections 105.

Returning to FIG. 1B, also included in data frame 100 are encryption data 120. The encryption data 120 allows security in the form of encryption to be applied to a data block group 115. Encryption data 120 includes a security parameter index (SPI) 125, a sequence number (SEQ) 130, and an initialization vector (IV) 135. The encryption data 120 allows a device receiving data frame 100 to determine the appropriate encryption key to decrypt the data contained in the data block group 115 associated with the encryption data 120.

For example, SPI 125 is an arbitrary value that is used to identify to the receiving device which encryption key was used to encrypt the data contained in data block group 115. Because SPI 125 is included in a data block, it can be a 64-bit value. Given this size, the SPI value may be used to communicate information in addition to the SPI value indicating the encryption key. For example, 32-bits of the 64-bits may serve as an in-band communication channel to communicate control information for the encryption used in data block group 115, while the remaining 32-bits may be used as the SPI value. Even using only 32-bits of the 64-bit value as the SPI value, the SPI 125 may still be used to identify $2^{16}$ or 65536 different keys.

Illustrated below in Table 1 is an example of the types of data that can be communicated through in-band communication in, for example, the first 32-bits of SPI 125.

TABLE 1

| Bits | Meaning | Notes |
|---|---|---|
| 0 | Encryption Enable | if '1' Encryption is active |
| 1 | Confidentiality - Authentication Enable | if '1' Authentication is active |
| 3 | Ready to Sec | If '1' Ready to run Security Algorithm |
| 6 | Change Master key on next packet | if '1' the Master Key will be changed on next packet |
| 7 | New Master key available | if '1' New Master key is available |
| 8 | Backward Authentication Failed | if '1' Authentication failed on Receiving Side |
| 9:14 | SPI Advanced Encryption Standard (AES) Secured packet Version | SPI AES Version (6 bits) |
| 15:31 | Current Key index | Pointer to current used (expanded) key (16 bits) |

As illustrated in Table 1, the first 32 bits (i.e., 4 bytes) of SPI 125 provide a key agreement channel for the sharing of key, secret seed, and authentication and encrypted key management protocols. In other words, the first 32-bits provide an in-band channel to enable key agreement exchange between nodes. Assuming each data block group has a period of 13.1 μs, and a 4-row data frame has a period of 52.4 μs, dedicating 32-bits (i.e., 4 bytes) of SPI 125 to management provides for a 2.44 Mbit/s management channel.

Because encryption data 120 is included with every data block group 115, SPI 125 may differ for every data block group 115. Accordingly, different encryption may be used for different data block groups 115 within a single data frame 100. For example, if data frame 100 includes four data block groups 115 (i.e., four rows), such as data frame 200 of FIG. 2, different encryption keys may be used to encrypt each of the four data block groups 115. A data frame 100 that includes eight data block groups 115 (i.e., eight rows), different encryption keys may be used to encrypt each of the eight data block groups 115.

Also included in encryption data 120 is sequence number 130. Sequence number 130 is also included in a data block of calendar structure 110. In the example of FIG. 1B, it is a 64-bit value. Sequence number 130 is a monotonically increased (i.e., incremented) value that is used to, for example, prevent replay attacks. Sequence number 130 may be unique for every security association, i.e., unique for every encryption/decryption operation. Sequence number 130 may be designed as a synchronous counter, incremented for every security association. As encryption data 120 is included with every data block group 115, sequence number 130 may be incremented for every data block group 130. Upon receipt at a receiving device, sequence number 130 will be checked to ensure that it is larger than the previously received sequence number 130, and that it is incremented relative to the previously received sequence number. Furthermore, each time the encryption key is changed (which will be reflected in a change in SPI 125), sequence number 130 may be reset. Finally, in the example in which the sequence number 130 is 64-bits, the number of packets that may be encrypted/decrypted with a single encryption key may be as large as $2^{64}-1$.

In addition to both SPI 125 and sequence number 130, initialization vector 135 is also included in encryption data 120. Some encryption algorithms use initialization vectors (or nonces) to guarantee the security of the encryption algorithm. An initialization vector 135 is an unpredictable random or pseudo-random number used to make sure that when the same message is encrypted twice, the ciphertext is different. Accordingly, initialization vector 135 is included in encryption data 120.

Initialization vector 135 may be generated for inclusion in encryption data 120 in different ways. One way to implement an initialization vector 135 is through the use of a deterministic initialization vector. A simple deterministic initialization vector is used as a counter that initializes an integer variable to zero. Each time that an initialization vector is needed, the integer value is output as the initialization vector by the encrypting device, and the integer value is then incremented for use as the next initialization vector. According to other examples, initialization vector 135 is generated from a Fibonacci Linear Feedback Shift Register. A Fibonacci Linear Feedback Shift Register is a sequential shift register with combinational logic (e.g., "XOR" logic) generating a pseudo-random sequence of binary values. When a Fibonacci Linear Feedback Shift Register is used to generate initialization vector 135, the Fibonacci Linear Feedback Shift Register is used to generate a sequence of values that is 64-bits in length. The initialization vector 135 may be changed for every data block group 115, i.e., every time new encryption data 120 is transmitted.

Following encryption data 120 is authentication data 140. Included in authentication data 140 is an integrity check value (ICV) 145. According to the example of FIG. 1B, integrity check value 145 is spread across two data blocks, data blocks 145a and 145b. Integrity check value 145, sometimes known as a checksum, is a block of digital data for the purpose of detecting errors which may have been introduced during its transmission. Integrity check value 145 is a value that is calculated based on the transmitted data. For example, integrity check value 145 may be a hash value calculated based on the data transmitted within data block group 115. The transmitting device will calculate the integrity check value 145 and include it within data frame 100 for each data block group 115. Upon receipt of a data block group 115, the receiving device will also calculate the integrity check value. If the integrity check value calculated by the receiving device matches transmitted integrity check value 145, it may be determined that the data in the data block group 115 was transmitted correctly. On the other hand, if the integrity check value calculated by the receiving device does not match transmitted integrity check value 145, it may be determined that the data in the data block group 115 was not transmitted correctly. In the case of a mismatch between the calculated integrity check value and the transmitted integrity check value 145, the data block group 115 associated with the integrity check value 145 may be discarded.

Because integrity check value 145 is spread across two data blocks, blocks 145*a* and 145*b*, it may be a 16-byte value, thereby providing very strong authentication. According to other examples, an even greater number of data blocks, such as four data blocks, may be used for the integrity check value 145, providing even stronger authentication. As data frame 100 and data block groups 115 may include large amounts of data (e.g., having data block groups of 1023×20×8 bytes), a longer integrity check value 145 may be beneficial.

A count may be made of the number of times that there is a mismatch between the calculated integrity check value and the received integrity check value 145. If this count reaches a predetermined threshold, it may be determined that there is a problem with the transport channel between the transmitting and receiving devices. An alarm or indication of this problem may be triggered in response to the threshold being met. The count or accumulation of the number of mismatches may be maintained by either the transmitting or the receiving device. When the transmitting device counts the number of mismatches, a process will be established for the receiving device to indicate to the transmitting device when a mismatch has taken place.

The integrity check value 145 may be transmitted before or after the data block group 115 with which it is associated. For example, integrity check value 145 may be associated with either the data block group within which integrity check value 145 is transmitted, or with the data block group 115 that was transmitted prior to the data block group within which integrity check value 145 is transmitted. Authentication of a data block group may be performed before forwarding the decrypted data block to a final destination. By performing the authentication at this time, resources will not be wasted processing data block groups that were incorrectly transmitted.

Figure 3:
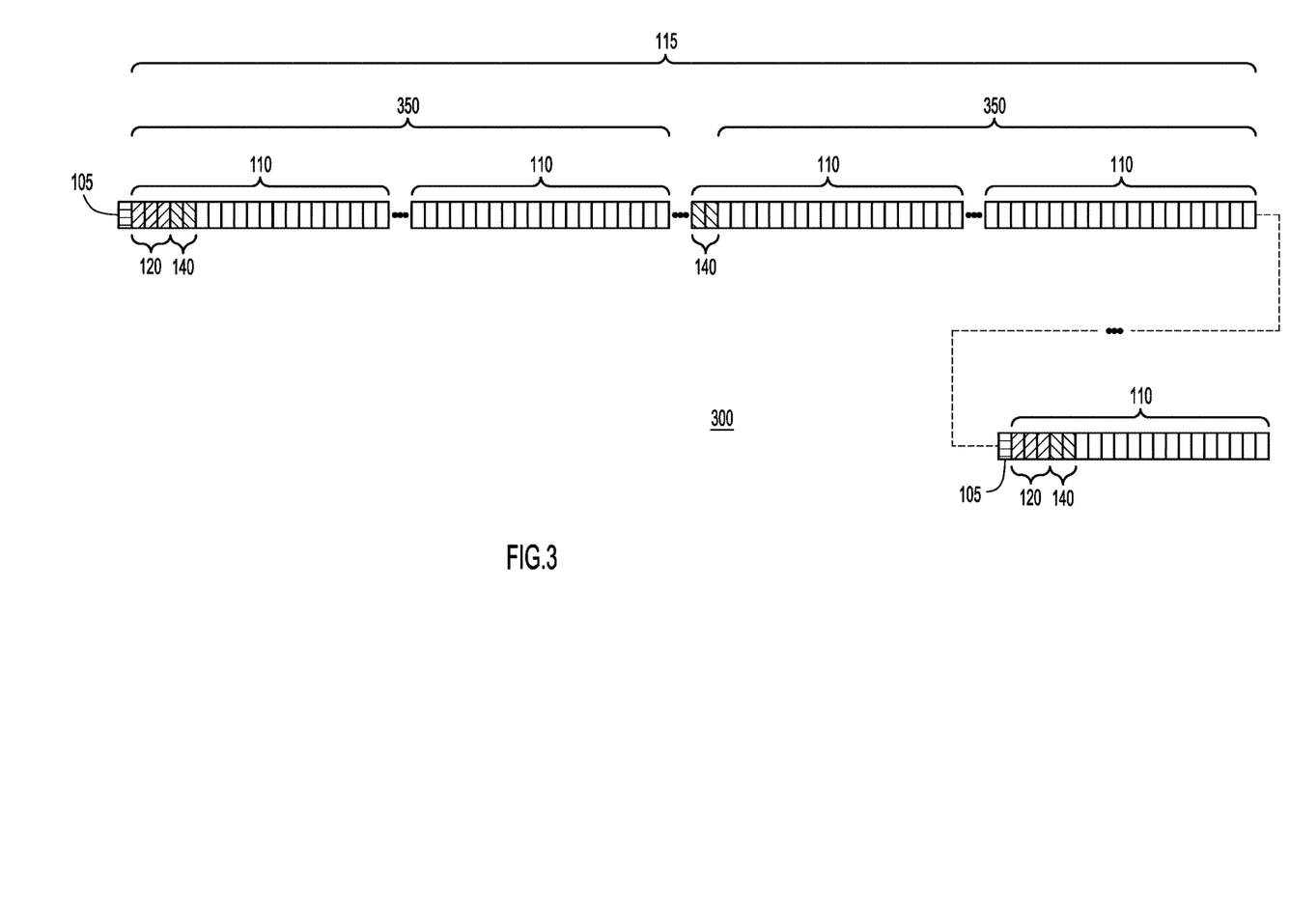
FIG. 3 is an illustration of an encrypted and authenticated data frame that includes authentication information in sub-data block groups throughout the data frame, according to an example embodiment.

With reference now made to FIG. 3, depicted therein is a data frame 300 in which authentication data 140 is included at intervals within data block groups 115, i.e., authentication data 140 is provided for subsets of data within each data block group 115. Specifically, authentication data 140 is included with each of sub-data block groups 350. In the example of FIG. 3, authentication data 140 is not just included in the first calendar structure 110 of a data block group 115. Authentication data 140 is also included in sub-data block groups 350. When included in sub-data block groups 350, authentication data 140 no longer authenticates an entire data block group 115. Instead, the authentication data 140 of FIG. 3 authenticates a single sub-data block group 350. Authentication data 140 may authenticate the sub-data block group within which it is transmitted, or authentication data 140 may authenticate the sub-data block group transmitted prior to the sub-data block group within which it is transmitted.

The number of sub-data block groups 350 within a data block group 115 may be selected so that an integer number of sub-data block groups 350 fit within a data block group 115. Assuming, in one example, that there are 1024 calendar structures 110 within data block group 115, the number of sub-data block groups 350 within data block group 115 may be an exponent of 2, i.e., the number of sub-data block groups may be comprised of $2^n$ calendar structures, where n is greater than or equal to zero and less than or equal to 10. For example, authentication data 140 may be provided with one of every 128 calendar structures 110 (i.e., n=7). According to other examples, authentication data 140 may be provided with one of every 256 calendar structures 110 (i.e., n=8). The example of FIG. 1B, on the other hand, has authentication data 140 provided with one of every 1024 calendar structures 110 (i.e., n=10) which is the maximum allowed.

The techniques described above may also be applied to data frames that include, for example, 1023 calendar structures 110. The number of calendar structures 110 in such a data frame is not evenly divisible by 128 and/or 256. Therefore, one or more of the sub-data block groups 350 may be comprised of fewer than 128 or 256 calendar structures 110. For example, one sub-data block group 350 in the data frame may include 127 and/or 255 calendar structures 110, while the remaining sub-data block groups 350 each contain 128 or 256 calendar structures 110, respectively. According to other examples, the data frame may include sub-data block groups 350, each comprised of a number of calendar structures 110 by which 1023 is easily divisible. For example, each sub-data block group 350 may be comprised of 341 calendar structures 110.

By including authentication data 140 more frequently throughout data frame 300, memory usage and latency may be reduced at the receiving device. For example, if authentication data 140 is included with every 256 calendar structures 110, only 42240 bytes need to be stored at the receiving device for authentication. If authentication data 140 is included with every 128 calendar structures 110, only 21120 bytes need to be stored at the receiving device for authentication.

Figure 4:
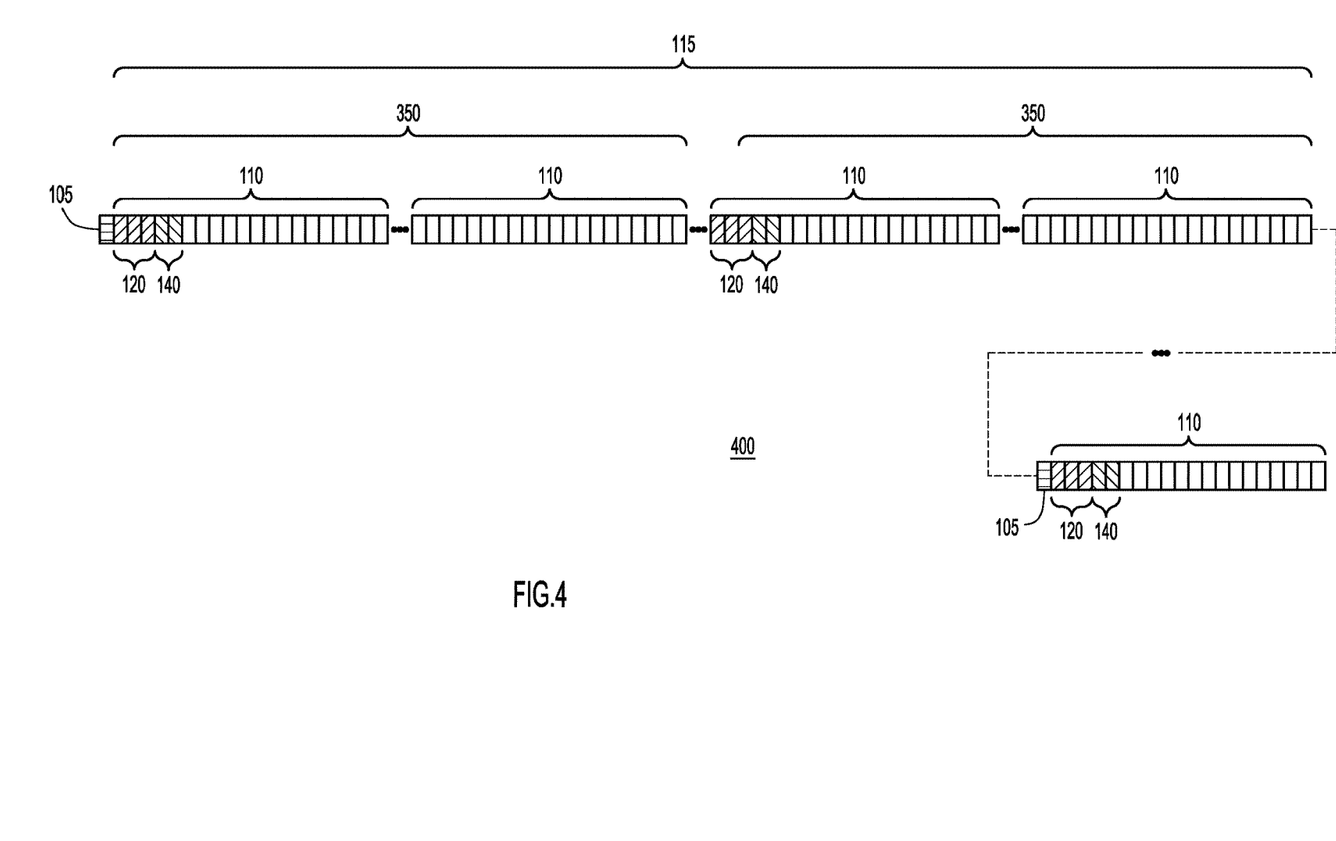
FIG. 4 is an illustration of an encrypted and authenticated data frame that includes authentication information and encryption information in sub-data block groups throughout the data frame, according to an example embodiment.

With reference now made to FIG. 4, depicted therein is a data frame 400 in which encryption data 120, as well as authentication data 140, is included at intervals within data block groups 115. Specifically, encryption data 120 is included with each of sub-data block groups 350. Once again assuming there are 1023 calendar structures 110 within data block group 115, the number of sub-data block groups 350 within data block group 115 may be an exponent of 2, i.e., the number of sub-data block groups may be comprised of $2^n$ calendar structures, where n is greater than or equal to zero and less than or equal to 10. This assumes that one sub-data block group may include one or more fewer calendar structures 110 as the other sub-data block groups, as described above with reference to FIG. 3. Accordingly, encryption data 120 and authentication data 140 may be included with every $2^n$ calendar structures within a data block group 115. Furthermore, because each sub-data block group 450 is provided with separate encryption information 120, each sub-data block group 350 may be encrypted with a different encryption key.

Figure 5:
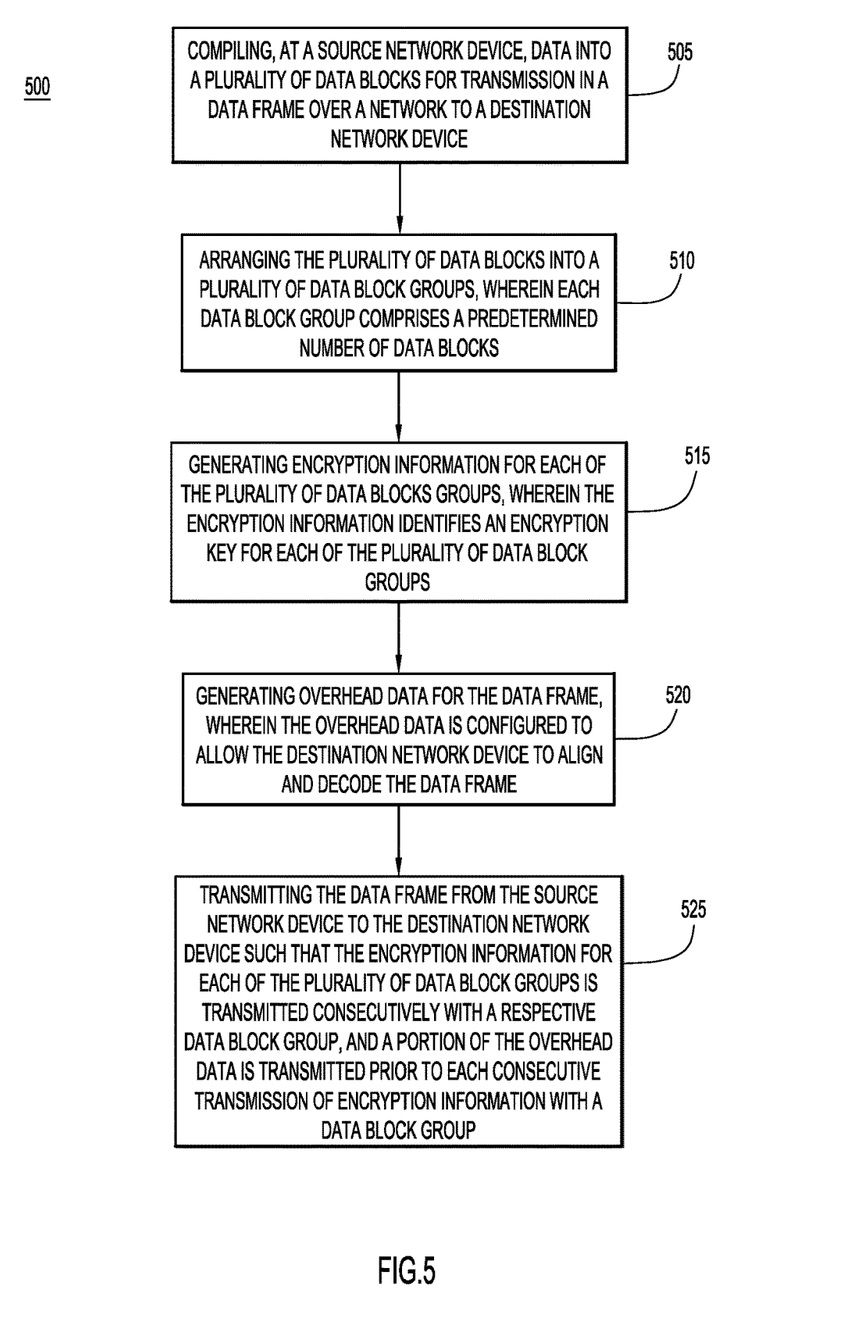
FIG. 5 is a flowchart illustrating a process for transmitting an encrypted and authenticated data frame, according to an example embodiment.

With reference now made to FIG. 5, depicted therein is flowchart 500 for a process of transmitting a data frame, such as data frame 100 of FIG. 1B. The process begins in operation 505 wherein a plurality of data blocks are compiled at a source (e.g., transmitting) network device for transmission over a network to a destination network device. In operation 510, the plurality of data blocks are arranged into a plurality of data block groups, wherein each data block group contains a predetermined number of data blocks. Using data frame 100 of FIG. 1B as an example, the data blocks are first arranged into calendar structures 110. The calendar structures are then arranged into data block groups 115.

In operation 515, encryption information is generated for each of the plurality of data block groups. The encryption information may identify an encryption key for each of the plurality of data block groups. The encryption information may include, for example, a security parameter index, a sequence number and/or an initialization vector. The encryption information may be generated for an entire data block group, as described above with reference to FIG. 1B, or for subsets within the data block group as described above with reference to FIG. 4.

In operation 520, overhead data is generated for the data frame, and is configured to allow the destination network device to align and decode the data frame. Finally, in operation 525, the data frame is transmitted from the source network device to the destination network device such that the encryption information for each of the plurality of data block groups is transmitted consecutively with a respective data block group, and a portion of the overhead data is transmitted prior to each consecutive transmission of encryption information with a data block group. In other words, the overhead and encryption information is transmitted with the data block group as illustrated, for example, in FIGS. 1, 2, 3 and/or 4.

In addition to the operation included in FIG. 5, additional operations may include encrypting the data contained in the data block groups, and generating authentication information, such as authentication information 140, described above with reference to FIGS. 1A, 1B, 3 and 4. Furthermore, the transmission of the data frame may include transmitting the authentication information with the data frame as illustrated in FIGS. 1A, 1B, 3 and 4.

Figure 6:
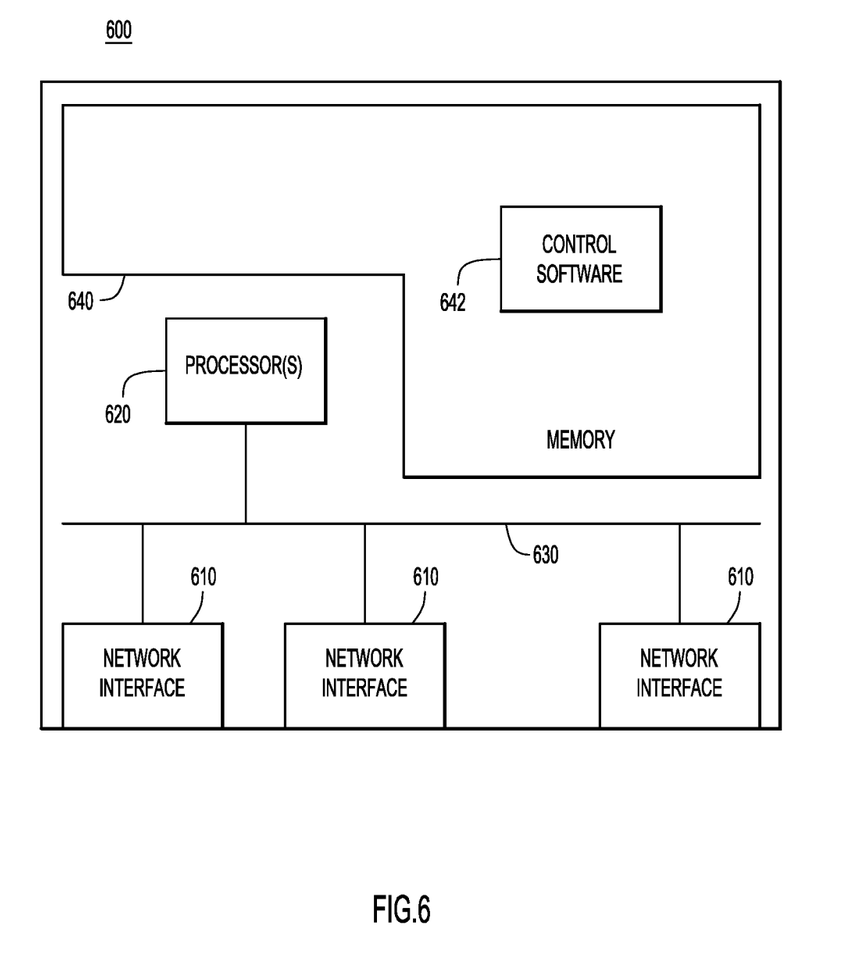
FIG. 6 is a block diagram of a device configured to generate, transmit and receive encrypted and authenticated data frames, according to an example embodiment.

With reference now made to FIG. 6, depicted therein is a device 600. Device 600 may be a network device configured to perform the techniques described herein. Device 600 includes network interfaces (e.g., network ports) 610 which may be used to receive and send data frames over a network. The network interfaces 610 may be included as part of a network interface unit (e.g., a network interface card). Accordingly, network interfaces 610 may be embodied as wired interfaces, wireless interfaces, optical interfaces, electrical interfaces, or a combination thereof. When embodied as optical interfaces, network interfaces 610 include transmit optical sub assemblies and/or receive optical sub assemblies configured to send and received optical signals over single and multimode optical fibers. Included in the transmit and receive optical sub assemblies are optical components configured to focus an optical signal to or from an optical fiber, multiplexer/demultiplexer components configured to combine/separate optical signals by wavelength, and optoelectrical components configured to convert between electrical and optical signals.

The one or more processors 620 are provided to coordinate and control device 600. The processor 620 is, for example, one or more microprocessors or microcontrollers, and it communicates with the network interfaces 610 via bus 630. Memory 640 stores software instructions for control software 642 which may be executed by the processor 620. For example, control software 642 for device 600 includes instructions for performing the techniques described above with reference to FIGS. 1A-5. In other words, memory 640 includes instructions for device 600 to carry out the operations described above in connection with FIGS. 1A-5. Specific instructions within memory 640 may cause device 600 to, for example, generate and transmit data frames as described above with reference to FIGS. 1A-5. Instructions within memory 640 may also cause device 600 to, for example, receive and decode data frames as described above with reference to FIGS. 1A-5.

Memory 640 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 640 may be or include one or more tangible (non-transitory) computer readable storage media (e.g., a memory device) encoded with software comprising computer executable instructions. When the instructions of the control software 642 are executed (by the processor 620), the processor is operable to perform the operations described herein in connection with FIGS. 1A-5.

In summary, provided herein is a method for generating and transmitting encrypted and authenticated data frames. The method includes compiling, at a source network device, data into a plurality of data blocks for transmission in a data frame over a network to a destination network device. The method further includes arranging the plurality of data blocks into a plurality of data block groups, wherein each data block group comprises a predetermined number of data blocks. Encryption information is generated for each of the plurality of data block groups, wherein the encryption information identifies an encryption key for each of the plurality of data block groups. The methods may also include generating authentication information for each of the plurality of data block groups. Overhead data is also generated for the data frame, wherein the overhead data is configured to allow the destination network device to align and decode the data frame. The data frame is transmitted from the source network device to the destination network device such that the encryption information for each of the plurality of data block groups is transmitted consecutively with a respective data block group, and a portion of the overhead data is transmitted prior to each consecutive transmission of encryption information with a data block group.

Also provided herein is an apparatus configured to generate and transmit encrypted and authenticated data frames. The apparatus compiles, via a processor, data into a plurality of data blocks for transmission in a data frame over a network to a destination network device. The processor arranges the plurality of data blocks into a plurality of data block groups, wherein each data block group comprises a predetermined number of data blocks. Encryption information is generated by the processor for each of the plurality of data block groups, wherein the encryption information identifies an encryption key for each of the plurality of data block groups. The apparatuses may also generate, via the processor, authentication information for each of the plurality of data block groups. Overhead data is also generated by the processor for the data frame, wherein the overhead data is configured to allow the destination network device to align and decode the data frame. The data frame is transmitted via a network interface to the destination network device such that the encryption information for each of the plurality of data block groups is transmitted consecutively with a respective data block group, and a portion of the overhead data is transmitted prior to each consecutive transmission of encryption information with a data block group.

In still another form, non-transitory computer readable storage media are encoded with software comprising computer executable instructions that, when executed, the instructions are operable to generate and transmit encrypted and authenticated data frames. Specifically, the instructions are operable to compile data into a plurality of data blocks for transmission in a data frame over a network to a destination network device. The instructions are further operable to arrange the plurality of data blocks into a plurality of data block groups, wherein each data block group comprises a predetermined number of data blocks. The instructions are operable to generate encryption information for each of the plurality of data block groups, wherein the encryption information identifies an encryption key for each of the plurality of data block groups. The instructions are also operable to generate authentication information for each of the plurality of data block groups. Overhead data is also generated for the data frame, wherein the overhead data is configured to allow the destination network device to align and decode the data frame. The instructions are operable to transmit the data frame to the destination network device such that the encryption information for each of the plurality of data block groups is transmitted consecutively with a respective data block group, and a portion of the overhead data is transmitted prior to each consecutive transmission of encryption information with a data block group.

Accordingly, through the techniques described herein, encrypted and authenticated data frames are provided. The data frames include security parameter indexes, sequence numbers and initialization vectors to support the encryption, and integrity check values to support the authentication. Data frames as described herein also provide for an in-band channel to enable key agreement exchange protocols between nodes.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   compiling, at a source network device, data into a plurality of data blocks for transmission in a data frame over a network to a destination network device;
   arranging the plurality of data blocks into a plurality of data block groups comprising a first data block group, a second data block group, a third data block group and a fourth data block group, wherein each data block group comprises a predetermined number of data blocks;
   generating encryption information for each of the first data block group, the second data block group, the third data block group and the fourth data block group, wherein the encryption information identifies an encryption key for each of the first data block group, the second data block group, the third data block group and the fourth data block group;
   generating overhead data for the data frame, wherein the overhead data is configured to allow the destination network device to align and decode the data frame; and
   transmitting the data frame from the source network device to the destination network device, wherein transmitting the data frame comprises:
      transmitting a first portion of the overhead data, followed by the encryption information for the first data block group, followed by the first data block group;
      transmitting a second portion of the overhead data after the first data block group, followed by encryption information for the second data block group, followed by the second data block group;
      transmitting a third portion of the overhead data after the second data block group, followed by encryption information for the third data block group, followed by the third data block group; and
      transmitting a fourth portion of the overhead data after the third data block group, followed by encryption information for the fourth data block group, followed by the fourth data block group.

2. The method of claim 1, wherein arranging the plurality of data blocks into the plurality of data block groups comprises:
   arranging 20460 data blocks in the first data block group;
   arranging 20460 data blocks in the second data block group;
   arranging 20460 data blocks in the third data block group; and
   arranging 20480 data blocks in the fourth data block group.

3. The method of claim 1, further comprising generating an authentication code for each of the plurality of data block groups.

4. The method of claim 3, wherein generating the authentication code for each of the plurality of data block groups comprises generating a plurality of authentication codes for each of the plurality of data block groups, wherein each of the plurality of authentication codes authenticates a subset of data blocks within a data block group,
   wherein transmitting comprises transmitting each of the plurality of authentication codes consecutively with the subset of data blocks the authentication code is configured to authenticate within the plurality of data block groups.

5. The method of claim 4, wherein generating the plurality of authentication codes comprises generating an authentication code for $2^n$ data blocks, wherein n is an integer greater than 0.

6. The method of claim 4, wherein generating the plurality of authentication codes comprises generating a plurality of integrity check values.

7. The method of claim 1, wherein generating encryption information for each of the plurality of data blocks groups comprises generating a security parameter index, a sequence number and an initialization vector for each of the plurality of data block groups.

8. The method of claim 1, wherein the encryption information for each of the plurality of data blocks groups identifies a different encryption key.

9. The method of claim 1, wherein transmitting the data frame comprises arranging the plurality of data blocks into a frame formatted according to the Flex Ethernet Implementation Agreement (FlexE) of the Optical Internetworking Forum.

10. An apparatus comprising:
a network interface configured to send and receive data over a network; and
a processor, wherein the processor is configured to:
compile data into a plurality of data blocks for transmission in a data frame over the network to a destination network device;
arrange the plurality of data blocks into a plurality of data block groups comprising a first data block group, a second data block group, a third data block group and a fourth data block group, wherein each data block group comprises a predetermined number of data blocks;
generate encryption information for each of the first data block group, the second data block group, the third data block group and the fourth data block group, wherein the encryption information identifies an encryption key for each of the first data block group, the second data block group, the third data block group and the fourth data block group;
generate overhead data for the data frame, wherein the overhead data is configured to allow the destination network device to align and decode the data frame; and
transmit, via the network interface, the data frame to the destination network device, wherein the processor is configured to transmit the data frame by:
transmitting a first portion of the overhead data, followed by the encryption information for the first data block group, followed by the first data block group;
transmitting a second portion of the overhead data after the first data block group, followed by encryption information for the second data block, followed by the second data block group;
transmitting a third portion of the overhead data after the second data block group, followed by encryption information for the third data block group, followed by the third data block group; and
transmitting a fourth portion of the overhead data after the third data block group, followed by encryption information for the fourth data block group, followed by the fourth data block group.

11. The apparatus of claim 10, wherein the processor is further configured to generate an authentication code for each of the plurality of data block groups.

12. The apparatus of claim 11, wherein the processor is configured to generate the authentication code for each of the plurality of data block groups by generating a plurality of authentication codes for each of the plurality of data block groups, wherein each of the plurality of authentication codes authenticates a subset of data blocks within a data block group, and
wherein the processor is configured to transmit the data frame by transmitting each of the plurality of authentication codes consecutively with the subset of data blocks the authentication code is configured to authenticate within the plurality of data block groups.

13. The apparatus of claim 11, wherein the processor is configured to generate the plurality of authentication codes by generating a plurality of integrity check values.

14. The apparatus of claim 10, wherein the processor is configured to arrange the plurality of data blocks into a frame formatted according to the Flex Ethernet Implementation Agreement (FlexE) of the Optical Internetworking Forum.

15. The apparatus of claim 11, wherein the processor is configured to arrange the plurality of data blocks into the plurality of data block groups by:
arranging 20460 data blocks in the first data block group;
arranging 20460 data blocks in the second data block group;
arranging 20460 data blocks in the third data block group; and
arranging 20480 data blocks in the fourth data block group.

16. One or more non-transitory computer readable storage media encoded with software comprising computer executable instructions which when executed is operable to:
compile data into a plurality of data blocks for transmission in a data frame over a network to a destination network device;
arrange the plurality of data blocks into a plurality of data block groups comprising a first data block group, a second data block group, a third data block group and a fourth data block group, wherein each data block group comprises a predetermined number of data blocks;
generate encryption information for each of the first data block group, the second data block group, the third data block group and the fourth data block group, wherein the encryption information identifies an encryption key for each of the first data block group, the second data block group, the third data block group and the fourth data block group;
generate overhead data for the data frame, wherein the overhead data is configured to allow the destination network device to align and decode the data frame; and
transmit, via a network interface, the data frame to the destination network device, wherein the instructions are operable to transmit the data frame by:
transmitting a first portion of the overhead data, followed by the encryption information for the first data block group, followed by the first data block group;
transmitting a second portion of the overhead data after the first data block group, followed by encryption information for the second data block group, followed by the second data block group;
transmitting a third portion of the overhead data after the second data block group, followed by encryption information for the third data block group, followed by the third data block group; and
transmitting a fourth portion of the overhead data after the third data block group, followed by encryption information for the fourth data block group, followed by the fourth data block group.

17. The computer readable storage media of claim 16, further comprising instructions operable to generate an authentication code for each of the plurality of data block groups.

18. The computer readable storage media of claim 17, wherein the instructions operable to generate the authentication code for each of the plurality of data block groups are operable to generate a plurality of authentication codes for each of the plurality of data block groups, wherein each of the plurality of authentication codes authenticates a subset of data blocks within a data block group, and
wherein the instructions operable to transmit the data frame are operable to transmit each of the plurality of authentication codes consecutively with the subset of data blocks the authentication code is configured to authenticate within the plurality of data block groups.

19. The computer readable storage media of claim 17, wherein the instructions operable to generate the plurality of authentication codes are operable to generate a plurality of integrity check values.

20. The computer readable storage media of claim 16, wherein the instructions operable to arrange the plurality of data blocks are operable to arrange the plurality of data blocks into a frame formatted according to the Flex Ethernet Implementation Agreement (FlexE) of the Optical Internetworking Forum.

* * * * *